United States Patent Office 3,062,787
Patented Nov. 6, 1962

3,062,787
N-(3,3,4,4-TETRAFLUORO - CYCLOBUTYL 1 - SUB-STITUTED AMIDES AND THE PREPARATION THEREOF
David C. England, Wilmington, Del., assignor to E. I. du Pont de Nemours and Company, Wilmington, Del., a corporation of Delaware
No Drawing. Filed Nov. 23, 1959, Ser. No. 854,557
21 Claims. (Cl. 260—78)

This invention relates to, and has as its principal objects provision of, a new class of N-substituted amides, the N-(3,3,4,4 - tetrafluoro - 2,2 - dihalo-1-hydroxycyclobutyl)substituted amides, and the preparation of the same.

N-substitution of amides is old and has been generically applied to amides broadly, including not only carboxamides but also thionocarboxamides and sulfonamides, in both monomeric and polymeric forms. Generally such N-substituents have involved the introduction of relatively simple hydrocarbyl and simple substituted hydrocarbyl radicals by alkylation procedures; the introduction of relatively simple α-hydroxyhydrocarbyl substituents by direct, frequently necessarily catalyzed, reaction with aldehydes, foremost amongst which is formaldehyde resulting in the N-hydroxyethylamides; or the introduction of acyl substituents by direct acetylation reactions, again frequently necessarily catalyzed.

Amides are not normally considered as reactive with ketones. As a matter of fact, one of the conventional preparative routes to ketones involves the Grignard reaction on a carboxamide—see, for instance, page 306, "Organic Chemistry," Finar, Longmans Green & Company, 1956, fourth impression. The more reactive haloketones are known to react with amides. The reaction is a cyclization reaction, and in the case of the carboxamides, the α-haloketones form oxazoles in accord with the following equation—see page 646, ibid.:

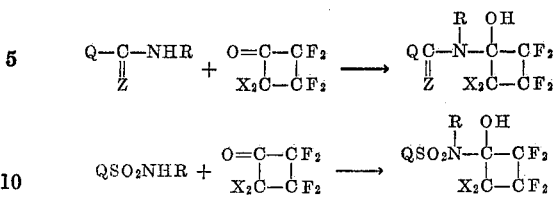

The same type reaction is also known to occur with the thionocarboxamides to form, in this instance, the thiazoles in accord with the following equation—see also page 646, ibid.:

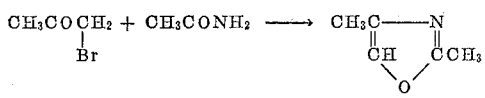

It has now surprisingly been discovered that amido-hydrogen-containing amides react smoothly and in high yield with 3,3,4,4-tetrafluoro-2,2-dihalocyclobutanones to form N-(3,3,4,4-tetrafluoro - 2,2 - dihalo-1-hydroxycyclobutyl)substituted amides. This reaction is applicable generically to all classes of amides carrying hydrogen on amido nitrogen and is accordingly inclusive of carboxamides, thionocarboxamides, and sulfonamides. Thus, the amide coreactants include compounds containing one or more carbamoyl, mono-N-hydrocarbylcarbamoyl, thionocarbamoyl, mono-N-hydrocarbylthionocarbamoyl, sulfonamido, and mono-N-hydrocarbylsulfonamido groups.

The amido-hydrogen-containing amide coreactants can be monomeric or polymeric. In either instance, the N—H group necessarily present in the amide coreactant adds across the C—O group of the 3,3,4,4-tetrafluoro-2,2-dihalocyclobutanone coreactant to form the new N-(3,3,4,4 - tetrafluoro-2,2-dihalo-1-hydroxycyclobutyl)substituted amide products of the present invention.

Thus, in the generic sense, the process of the present invention and the products obtained thereby can be illustrated by the following two equations:

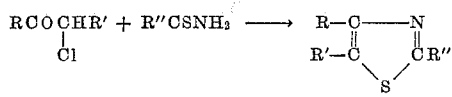

in which: (1) Q is used to represent the remainder of the amide molecule and can be monomeric or polymeric in nature; (2) Z is used to represent an element of group VI-A of atomic number from 8 to 16, inclusive, i.e., oxygen or sulfur; (3) R in the monomeric amides is used to represent hydrogen or monovalent hydrocarbyl radicals free of aliphatic unsaturation and of no more than 14 carbons each, i.e., hydrogen or monovalent alkyl, aryl, cycloalkyl, aralkyl, arcycloalkyl, alkaryl, alkcycloalkyl, cycloalkylalkyl, or cycloakylaryl radicals of no more than 14 carbons each and in the polymeric amides R is part of Q; (4) each Q and R in the same molecule can be joined together to form with the intervening amide group a cyclic structure of from 4 to 13 ring members; and (5) X is used to represent halogens, alike or different, of atomic number from 9 through 35, inclusive, i.e., fluorine, chlorine, or bromine.

The following examples in which the parts given are by weight are submitted to illustrate further but not to limit the present invention.

Example I

A thick-walled glass reactor approximately 20 diameters long and of internal capacity corresponding to about 150 parts of water was evacuated and cooled in a liquid nitrogen bath and then charged with a mixture of 16 parts of prefluorocyclobutanone and six parts (an equimolar proportion based on the ketone) of acetamide. The reactor was sealed, allowed to warm to room temperature, and heated at steam bath temperatures for 100 hours. The reactor was then cooled in a liquid nitrogen bath, opened, and the solid reaction mixture removed. There was thus obtained 21 parts (100% of theory) of N-(2,2,3,3,4,4 - hexafluoro - 1 - hydroxycyclobutyl)acetamide as a white crystalline solid melting at 130–132° C. and easily recrystallizable from water. The product can also be named 1-(acetamido)-2,2,3,3,4,4-hexafluorocyclobutanol. The nuclear magnetic resonance and infrared spectra were consistent with the acetamidohexafluorocyclobutanol structure.

Analysis.—Calcd. for $C_6H_5O_2NF_6$: C, 30.4%; H, 2.1%; N, 5.9%; F, 48.1%. Found: C, 30.7%; H, 2.2%; N, 5.9%; F, 47.7%.

Example II

As in Example I, a glass reactor was evacuated, cooled, and charged with 21 parts of perfluorocyclobutanone and 7.3 parts (an equimolar proportion based on the ketone) of N-methylacetamide. The reactor was sealed and allowed to warm to room temperature, at which point a spontaneous reaction occurred. After warming overnight at steam bath temperatures, the reactor was cooled in liquid nitrogen, opened, and the product removed. There was thereby recovered six parts (28.5% recovery) of perfluorocyclobutanone. The remaining solid product was recrystallized from benzene. There was thus obtained 14.5 parts (68% of theory) of N-(2,2,3,3,4,4-hexafluoro-1-hydroxycyclobutyl)-N-methylacetamide as white plates. After a second recrystallization from benzene, the plates exhibited a melting point of 142–150° C. with decomposition. The product can also be named 1-(N-methylacetamido)-2,2,3,3,4,4-hexafluorocyclobutanol. The nuclear magnetic resonance and infrared spectra were consistent with the N-methylacetamidohexafluorocyclobutanol structure.

*Analysis.*—Calcd. for $C_7H_7O_2NF_6$: N, 5.6%; F, 45.4%. Found: N, 5.5%; F, 45.4%.

Example III

As in Example I, a glass reactor was evacuated, cooled in liquid nitrogen, and charged with 12 parts of benzamide and 36 parts (2.0 molar proportions based on the amide) of perfluorocyclobutanone. The reactor was sealed and then allowed to warm to room temperature, at which point an exothermic reaction occurred. The reactor was then cooled in liquid nitrogen, opened, and the solid products removed. Upon recrystallization from chloroform, there was thus obtained 30 parts (100% of theory) of N-(2,2,3,3,4,4 - hexafluoro - 1 - hydroxycyclobutyl) benzamide as white crystals melting at 142–144° C. Recrystallization from chloroform raised the melting point to 144–145° C. The infrared spectrum was consistent with the 1-(benzamido)-2,2,3,3,4,4-hexafluorocyclobutanol structure.

*Analysis.*—Calcd. for $C_{11}H_7F_6NO_2$: F, 38.1%; N, 4.7%. Found: F, 37.4%; N, 4.8%.

Example IV

A heavy-walled, cylindrical glass reactor approximately eight diameters long and of internal capacity corresponding to about 15 parts of water was charged with 1.13 parts of ε-caprolactam, i.e., 2-oxohexamethylenimine. Air was displaced with nitrogen gas, and the reactor was cooled in a solid carbon dioxide/acetone bath and then evacuated. The cooled, evacuated reactor was charged with 1.8 parts (an equimolar proportion based on the lactam) of perfluorocyclobutanone, pressured to atmospheric pressure with gaseous nitrogen, sealed, allowed to warm to room temperature, and finally heated at 95° C. for 16 hours. The reactor was then cooled in a solid carbon dioxide/acetone bath, opened, and the solid product removed. There was thus obtained 2.82 parts (97% of theory) of crude N-(2,2,3,3,4,4-hexafluoro-1-hydroxycyclobutyl)caprolactum as a white solid, melting at about 150° C. The product was soluble in acetone, partly soluble in benzene and methylene dichloride, slightly soluble in water, easily soluble in dilute sodium hydroxide from which solution it was reprecipitated unchanged by neutralizing with dilute hydrochloric acid. After recrystallization from methylene dichloride, the melting point of the 1-(2,2,3,3,4,4-hexafluoro-1-hydroxycyclobutyl)-2-oxohexamethyleneimine was raised to 154.0–156.5° C. (dec.).

*Analysis.*—Calcd. for $C_{10}H_{11}F_6O_2N$: F, 39.2%; N, 4.8%. Found: F, 39.3%; N, 4.9%.

Example V

As in Example IV, a glass reactor but of internal capacity corresponding to 25 parts of water was charged with 5.65 parts of ε-caprolactam and about nine parts of methyl acetate. The reactor was flushed with nitrogen, evacuated, cooled in a solid carbon dioxide/acetone bath, and then charged with 8.9 parts (an equimolar proportion based on the lactam) of perfluorocyclobutanone. The reactor was sealed, allowed to warm to room temperature, and held for 24 hours under these conditions at 25° C. The reactor was then cooled in a solid carbon dioxide/acetone bath and opened. There was thus obtained 14.4 parts (substantially a quantitative yield) of N-(2,2,3,3,4,4-hexafluoro-1-hydroxycyclobutyl) caprolactam as a white solid, melting at 145–154° C.

Example VI

Following the procedure given in Example IV, another cylindrical glass reactor was charged with 0.3 part of urea and 1.8 parts (two molar proportions based on the urea) of perfluorocyclobutanone and sealed. The reactor was allowed to warm to room temperature, then heated to 95° C., and held there for sixteen hours. The reactor was then cooled in a solid carbon dioxide/acetone bath, opened, and the solid product removed. There was thus obtained 2.1 parts (100% of theory) of N,N'-bis(2,2,3,3,4,4-hexafluoro-1-hydroxycyclobutyl)urea as a semisolid product. The solid portion melted at 145–150° C. (dec.). The product was insoluble in water, soluble in dilute aqueous sodium hydroxide solution, and reprecipitated therefrom with dilute hydrochloric acid. The thus-purified ureylene - bis(2,2,3,3,4,4-hexafluoro-1-cyclobutanol) was sent for analysis.

*Analysis.*—Calcd. for $C_9H_4F_{12}O_3N_2$: N, 6.7%. Found: N, 7.0%.

Example VII

Example V was repeated substituting 1.5 parts of urea (an 0.5 molar proportion based on the perfluorocyclobutanone) for the ε-caprolactam. Charging procedures, reaction conditions, and workup were otherwise the same. There was thus obtained 9.4 parts (90% of theory) of the N,N' - bis(2,2,3,3,4,4 - hexafluoro - 1-hydroxycyclobutyl)-urea of Example VI, melting at 147–150° C. (dec.).

Example VIII

Example VI was repeated substituting 0.72 part (an 0.5 molar proportion based on the perfluorocyclobutanone) of adipamide for the urea. Charging procedures, reaction conditions, and workup were the same except that the reactor was heated at 100° C. for 22 hours. There was thus obtained 2.45 parts (96% of theory) of N,N'-bis-(2,2,3,3,4,4-hexafluoro-1-hydroxycyclobutyl)adipamide as a white crystalline solid, melting at 164–175° C. (dec.). The product was insoluble in water, soluble in dilute aqueous sodium hydroxide solution, and reprecipitatable therefrom with dilute hydrochloric acid solution.

Example IX

Example VII was repeated substituting 3.6 parts (an 0.5 molar proportion based on the hexafluorocyclobutanone) of adipamide for the urea. Charging procedures, reaction conditions, and workup techniques were the same. There was thus obtained 12.4 parts (substantially quantitative yield) of the N,N'-bis(2,2,3,3,4,4-hexafluoro-1-hydroxycyclobutyl)adipamide of Example VIII, melting point 164–174° C. (dec.).

*Analysis.*—Calcd. for $C_{14}H_{12}F_{12}O_4N_2$: F, 45.6%; N, 5.6%. Found: F, 44.5%; N, 5.5%.

Example X

Example VIII was repeated substituting 1.6 parts (1.41 molar proportions based on the hexafluorocyclobutanone) of poly-ε-aminocaproic acid, i.e., the linear condensation polyamide from ε-aminocaproic acid, for the adipamide. Charging procedures, reaction conditions, and workup techniques were the same except that the reactor was maintained at 100° C. for a period of 48 hours. There was thus obtained a brown solid product partly soluble in 1 N aqueous sodium hydroxide solution.

*Analysis.*—Calcd. for $(C_{10}H_{11}F_6O_2N)_n$: F, 39.2%; N, 4.8%. Found: F, 33.1%; N, 5.4%.

These results indicate that approximately 85% of the intrachain amide groups carry a lateral 2,2,3,3,4,4-hexafluoro-1-hydroxycyclobutyl substituent on the nitrogen atom thereof.

Example XI

Example X was repeated substituting 1.6 parts (1.41 molar proportions based on the hexafluorocyclobutanone) of commercially available polyhexamethyleneadipamide for the poly-ε-aminocaproic acid amide. Charging conditions, reaction conditions, and workup procedures were the same. There was thus obtained a brown solid product partly soluble in aqueous 1 N sodium hydroxide solution. The alkali-soluble portion was reprecipitated by addition of aqueous 1 N hydrochloric acid and, after drying, was sent for analysis.

*Analysis.*—Calcd. for $(C_{10}H_{11}F_6O_2N)_n$: F, 39.2%; N, 4.8%. Found: F, 34.6%; N, 5.4%.

These results indicate that approximately 90% of the intrachain amide nitrogen atoms of the polyhexamethyleneadipamide carry lateral 2,2,3,3,4,4-hexafluoro-1-hydroxycyclobutyl substituents on the nitrogen atoms thereof.

*Example XII*

A heavy-walled cylindrical glass reactor, as in Example IX, was charged, as there described, with 2.4 parts of commercially available polyhexamethyleneadipamide molding powder and 2.7 parts of hexafluorocyclobutanone (a 0.71 molar proportion based on the polyamide), sealed, and held at 25° C. for 96 hours. The reactor was cooled, opened, and the white solid product obtained was removed. The product was approximately 50% soluble in aqueous 1 N sodium hydroxide solution, from which solution the alkali-soluble modified polyamide was reprecipitated by addition of aqueous 1 N hydrochloric acid solution.

*Analysis.*—Calcd. for $(C_{10}H_{11}F_6O_2N)_n$: F, 39.2%; N, 4.8%. Found for whole product: F, 32.6%; N, 6.0%. Found for alkali-soluble portion: F, 32.3%; N, 4.6%. Found for alkali-insoluble portion: F, 0.6%; N, 11.8%.

These results for the alkali-soluble product indicate that about 82% of the intrachain amide nitrogens of the polyhexamethyleneadipamide structure now carry lateral 2,2,3,3,4,4-hexafluoro-1-hydroxycyclobutyl substituents on the nitrogen atoms thereof.

*Example XIII*

An open, cylindrical, glass reactor was charged with 1.15 parts of ε-caprolactam, i.e., 2-oxohexamethyleneimine, and 2.0 parts (an equimolar proportion based on the lactam) of hexafluorocyclobutanone hydrate, i.e., 1,1-dihydroxyhexafluorocyclobutane, and the reaction mixture heated to the boil. No reaction occurred. One part of acetic anhydride was then added and the reaction mixture heated at the boil for ten minutes. A solid product formed which was isolated and dried and characterized as the 1-(2,2,3,3,4,4-hexafluoro-1-hydroxycyclobutyl)-2-oxohexamethyleneimine of Example IV, melting point 151.5–153.5° C.

*Example XIV*

As in Example I, a glass reactor was evacuated, cooled in liquid nitrogen, and charged with three parts of thioacetamide (melting point 109–110° C.), about ten parts of anhydrous diethyl ether, and eight parts (1.1 molar proportions based on the thioacetamide) of perfluorocyclobutanone. The reactor was sealed, allowed to warm to room temperature, and shaken well. The reactor was then cooled in liquid nitrogen, opened, and warmed to about 60° C. while connected to an evacuated, liquid nitrogen-cooled trap to remove the diethyl ether solvent and any unreacted perfluorocyclobutanone. There was thus obtained 9.7 parts (96% of theory) of N-(2,2,3,3,4,4-hexafluoro-1-hydroxycyclobutyl)thioacetamide as a clear, residual oil; $n_D^{25}$, 1.4168. The infrared spectrum was wholly consistent with the 1-(thioacetamido)-2,2,3,3,4,4-hexafluorocyclobutanol structure.

*Example XV*

As in Example I, a glass reactor was evacuated, cooled in liquid nitrogen, and charged with three parts of thioacetanilide, about ten parts of anhydrous diethyl ether, and eight parts (2.3 molar proportions based on the thioacetanilide) of perfluorocyclobutanone. The reactor was sealed and then allowed to warm to room temperature. The reactor was shaken well and then cooled in a liquid nitrogen bath, opened, and connected to an evacuated, liquid nitrogen-cooled trap. The reactor was then warmed to about 60° C. to remove the diethyl ether and any unreacted perfluorocyclobutanone. There was thus obtained as a mixed oily/crystalline residue 6.3 parts (97% of theory) of crude N-(2,2,3,3,4,4-hexafluoro-1-hydroxycyclobutyl)thioacetanilide. The crystalline material was removed by filtration and the oily residue was identified as 1(N-phenylthioacetamido) - 2,2,3,3,4,4 - hexafluorocyclobutanol by infrared analysis. The crystalline material, amounting to 2.1 parts, was found to melt at 152–154° C. with evolution of perfluorocyclobutanone. The residue from this melting was found to be acetanilide and was so characterized by melting point and mixed melting point with an authentic sample of acetanilide, melting point 110–113° C. Accordingly, the original crystalline product from the reaction mixture was characterized as N-(2,2,3,3,4,4-hexafluoro-1-hydroxycyclobutyl)acetanilide arising from some acetanilide (resulting from hydrolysis) impurity in the starting thioacetanilide.

*Example XVI*

A glass reactor protected from atmospheric moisture was charged with a solution of 0.7 part of acetanilide in about 30 parts of anhydrous diethyl ether and one part (an equimolar proportion based on the acetanilide) of 2-chloro-2,3,3,4,4 - pentafluorocyclobutanone. The reaction mixture was allowed to stand for 0.5 hour at room temperature and about one half of the diethyl ether solvent was evaporated under nitrogen at room temperature. The remaining solution was decanted from 0.7 part of solid N - (2-chloro - 2,3,3,4,4-pentafluoro-1-hydroxycyclobutyl)acetanilide. More diethyl ether solvent was evaporated from the liquid residue and an additional 0.3 part of crystalline 1-(N-phenylacetamido)-2-chloro-2,3,3,4,4-pentafluorocyclobutanol obtained. The total yield of N-(2 - chloro - 2,3,3,4,4 - pentafluoro-1-hydroxycyclobutyl)acetanilide was 60% of theory. The product exhibited an infrared spectrum wholly consistent with the 1-(N-phenylacetamido) - 2 - chloro-2,3,3,4,4-pentafluorocyclobutanol structure.

*Example XVII*

As in Example I, a glass reactor was evacuated, cooled in liquid nitrogen, and charged with five parts of benzenesulfonamide, about ten parts of anhydrous diethyl ether, and eight parts (1.4 molar proportions based on the benzene-sulfonamide) of perfluorocyclobutanone. The reactor was sealed, allowed to warm to room temperature, and then heated for four hours at 100° C. At the end of this period, part of the benzenesulfonamide remained undissolved. The reactor was then heated for four hours at 150° C., at which point all the benzenesulfonamide had gone into solution. The reactor was then cooled in a liquid nitrogen bath and opened. The reaction mixture was removed and the diethyl ether solvent removed by distillation. The solid oily crystals of product were removed by filtration and washed with benzene. There was thus obtained 7.0 parts (65% of theory) of crude N-(2,2,3,3,4,4 - hexafluoro-1-hydroxycyclobutyl)benzenesulfonamide as oily crystals melting over the range 95–125° C. The crystalline solid was recrystallized from benzene. Two fractions were obtained, the first melting at 104–142° C. and the second melting at 84–112° C. The latter was purer N - (2,2,3,3,4,4 - hexafluoro-1-hydroxycyclobutyl)benzenesulfonamide but still contaminated with some of the higher melting benzenesulfonamide (M.P. 156° C.).

*Example XVIII*

A weighed piece of polyhexamythleneadipamide taffeta fabric was placed in a closed system comprising a glass tube connected by rubber tubing to a copper manifold attached to a cylinder of perfluorocyclobutanone. After evacuating the system for 15 minutes to remove air, the pressure was brought back to atmospheric by admitting perfluorocyclobutanone gas at room temperature. The system was maintained under these conditions for 30 minutes, repressuring the ketone as it was absorbed. The tube containing the treated nylon fabric was then sealed off and heated for one hour in an oven at 100° C. After treatment, the nylon fabric exhibited a 22% weight increase. After washing and redrying, the weight increase was still 12.7%. The treated fabric was stiffer than the original and showed improved water-repellent properties over an untreated nylon fabric control.

*Example XIX*

A washed and thoroughly dried (vacuum oven at 100° C. for two hours) piece of nylon taffeta fabric was exposed to the vapors of perfluorocyclobutanone in a closed tube in a manner similar to that of Example XVIII. The weight increase was 5.3%, and the treated cloth was more water repellent than a control.

*Example XX*

A piece of wool worsted cloth was thoroughly dried by heating for two hours in a vacuum oven at 100° C. and was then exposed to the vapors of perfluorocyclobutanone and heated for one hour at 100° C. as in Example XVIII. A weight increase of 13.5% was obtained.

*Example XXI*

A piece of unfinished top grain cowhide was carefully dried by heating under vacuum at 100° C. and was then exposed to the vapors of perfluorocyclobutanone and heated one hour at 100° C. as in Example XVIII. A weight gain of 23.6% was observed.

The present invention is generic to N-(3,3,4,4-tetrafluoro-2,2-dihalo-1-hydroxycyclobutyl)amides. It is likewise generic to the preparation of these new substituted amides by the direct addition reaction between the requisite amido-hydrogen-containing amide and the requisite 2,2-dihalo-3,3,4,4-tetrafluorocyclobutanone. The amide hydrogen adds across the ring carbonyl of the tetrafluorodihalocyclobutanone with the hydrogen adding to the oxygen forming an hydroxyl group, and the remaining valence bond of the original carbonyl double bond of the cyclic ketone then adding to the amido nitrogen from which the hydrogen came. Thus, the radical pendent on the ring carbon of the tetrafluorodihalohydroxycyclobutane moiety is the monovalent radical resulting from the removal of one amido hydrogen from the starting amide structure. Preferably, in the case of the monomeric amides, other than the necessarily present amido-hydrogen-bearing amide groups, the structure of the molecule will otherwise be solely hydrocarbon, free of aliphatic unsaturation. In the case of the polymeric amides, the same preference also applies, except that, of course, there will be present more than one amide group. In general, between about 5 and 95% of the polymeric amide groups will be substituted with about 50% and up being preferred. Because of greater chemical reactivity with the fluorocyclobutanones the preferred amides, both monomeric and polymeric, are the carboxamides.

The reaction is a simple one and requires no complicated operating procedures or equipment. Generally the reaction is carried out in sealed reactors, of which the most convenient are glass or glass-lined reactors. Because of the relatively low boiling nature of some of the 3,3,4,4-tetrafluoro-2-,2-dihalocyclobutanones and likewise because of the extreme chemical reactivity of these compounds, e.g., with, for instance, water, and especially with some of the present coreactants, the reaction will generally be carried out by cooling the reactor to liquid nitrogen temperatures or at least to those of solid carbon dioxide (about −80° C.), charging the particular 3,3,4,4-tetrafluoro-2-,2-dihalocyclobutanone involved as well as the amido-hydrogen-containing amide coreactant, purging the reaction vessel with nitrogen, sealing, and allowing the reactor to warm slowly to room temperature. With the higher boiling ketones and ketone hydrates, sealed systems are not normally used. The reaction will simply be carried out under anhydrous conditions. Elevated temperatures up to 150°–200° C. can be and sometimes must be used.

The cycloaddition reaction is effected thermally. Depending on the relative reactivity of the tetrafluorodihalocyclobutanones and amido-hydrogen-containing coreactants, the necessary reaction temperatures and reaction times will vary. With the more reactive pairs, the reaction is spontaneous and exothermic, sometimes even at low temperatures. Accordingly appropriate care should be taken in charging the reactants. Normally temperatures in the range 75–80° C. will suffice for most of the systems. Reaction times will vary from a few minutes to a few hours. In the case of the less reactive systems, higher temperatures and longer reaction times, e.g., a few days, will be needed. Temperatures higher than in the range 150–200° C. will normally not be required. Under these conditions even with the less reactive systems reaction times required will be at most a few hours to a few days. For convenience, an overnight period is frequently used. In those instances wherein the reaction is carried out in a sealed reactor at temperatures above the boiling points of the ketones, the reaction will, of course, be affected at elevated pressures. No externally applied pressure is required. The simple autogenous pressure of the reactants under the temperature conditions used will suffice.

The reaction mixtures are worked up quite simply to obtain the tetrafluorodihalohydroxyclclobutyl-substituted products. Thus, at the completion of the reaction it is only necessary to open the reactor, distill away any unreacted tetrafluorodihalocyclobutanone or amido-hydrogen-containing amide coreactant, and isolate and purify the desired products.

The reaction can be effected properly in the presence or absence of an inert organic reaction medium, which, if present, should be anhydrous. Any inert liquid organic diluent can be used and, generally speaking, the most common are the normally liquid hydrocarbons, polyfluorohydrocarbons, and ethers, including aliphatic and aromatic compounds such as the hexanes, heptanes, octanes, and the like; benzene, toluene, the xylenes, and the like; cycloaliphatic hydrocarbon solvents such as cyclohexane and the like; hydrocarbon ethers such as dipropyl and dibutyl ethers, and the like; the polyfluoroaliphatic hydrocarbons, e.g., 1,1,2,2-tetrafluoro-3,3-dimethylbutane, and the like; the polyfluoroaliphatic/cycloaliphatic hydrocarbons, e.g., perfluorodimethylcyclohexane, and the like. The choice of the particular diluent, if used, is not at all critical and will vary with such other normal variables as the temperature found necessary to effect reaction. In most instances, in order to simplify the reaction, no diluent is used. The requisite 3,3,4,4-tetrafluoro-2,2-dihalecyclobutanone and amido-hydrogen-containing amide coreactant are simply mixed and heated together as described previously and the product isolated therefrom after the reaction has been completed. The absence of a diluent generally makes separation of unreacted material and the desired products easier.

From the foregoing it is apparent that, in preparing these new tetrafluorodihalohydroxycyclobutyl-substituted products, there can be used any 3,3,4,4-tetrafluoro-2,2-dihalocyclobutanone wherein the two halogen substituents are of atomic number from 9 to 35, inclusive, i.e., fluorine, chlorine, and bromine, alike or different. More specifically, there can be used perfluorocyclobutanone, 2-chloro-2,3,3,4,4-pentafluorocyclobutanone, 2-bromo-2,3,3,4,4-pentafluorocyclobutanone, 2-bromo-2-chloro-3,3,4,4-tetrafluorocyclobutanone, 2,2-dichloro-3,3,4,4-tetrafluorocyclobutanone, and 2,2-dibromo-3,3,4,4-tetrafluorocyclobutanone.

Of these polyfluorocyclobutanones, the various chlorofluorocyclobutanones have been disclosed in U.S. Patents 2,712,554 and −5, although no detailed method for the preparation thereof is given. Perfluorocyclobutanone is a new compound per se and is being claimed in the copending and coassigned application of England, Serial No. 757,701, filed August 28, 1958. All of these polyfluoroperhalocyclobutanones can be readily prepared by the cycloaddition reaction between perfluorovinyl hydrocarbyl ethers with the requisite 1,1-dihalo-2,2-difluoroethylenes followed by hydrolysis of the resultant 1-hydrocarbyloxy - 1,3,3,4,4 - pentafluoro - 2,2 - dihalocyclobutanes. These cyclobutanones are generically gaseous to liquid, depending on the total molecular weight which varies with the halogens, quite reactive materials which should preferably be handled under anhydrous conditions.

As the cycloaddition coreactants with the just-described tetrafluorodihalocyclobutanones to make the new mono- and bis-3,3,4,4-tetrafluoro - 2,2 - dihalo-1-hydroxycyclobutyl-substituted products of the present invention, there can be used any amido-hydrogen-containing amide coreactant.

The present invention which is generic to the new N-tetrafluorodihalohydroxycyclobutyl-substituted amides is likewise generic to the preparation thereof from the previously described 2,2-dihalo-3,3,4,4-tetrafluorocyclobutanones and amido-hydrogen-bearing amides, inclusive of both monomeric and polymeric carboxamides and sulfonamides, as well as the corresponding thio- or thionocarboxamides. Thus, there can be used in the preparation of these new products alkyl amido-hydrogen-bearing carboxamides, such as, formamide, pentadecanamide, N-tetradecylpentadecanamide, N,N' - dimethyladipamide, thioformamide, and the like; cyclic alkyl amido-hydrogen bearing carboxamides, such as, ε-caprolactum, 6-methyl-2-piperidone, 2-pyrrolidone, and the like; aryl carboxamides, such as, anthracenecarboxamide, N-phenylthiobenzamide, and the like; cycloalkyl carboxamides, such as, cyclohexanecarboxamide, N-phenylcyclohexanethiocarboxamide, and the like; aralkyl carboxamides, such as, C-phenylacetamide, 1-naphthalenebutyramide, i.e., 4-(1-naphthyl)-n-butyramide, and the like; cycloalkyl-substituted alkylcarboxamides, such as cyclohexaneacetamide, i.e., 2-(cyclohexyl)acetamide, and the like cycloalkyl-substituted arylcarboxamides, such as, cyclohexanebenzamide, i.e., 4-(cyclohexyl)benzamide, and the like; aryl-substituted cycloalkylcarboxamides, such as, benzenecyclohexanecarboxamide, i.e., 4-phenylcyclohexanecarboxamide, and the like; aryl sulfonamides, such as, benzenesulfonamide and the like; cycloalkyl sulfonamides, such as cyclohexanesulfonamide, and the like; alkyl sulfonamides, such as, 1-propanesulfonamide and the like; ureas and substituted ureas, such as, biuret, N,N'-ditetradecylurea, and the like; polycarboxamides, such as, polyhexamethylenesebacamide, polydecamethyleneadipamide, polydecamethylenesebacamide, and polytetramethylenesuberamide; and the like.

Using the reaction conditions outlined in the foregoing, there will be obtained from the specific 3,3,4,4-tetrafluoro-2,2-dihalocyclobutanones and the amido-hydrogen-containing amides, just discussed generically and illustrated with suitable specific examples, additional N-(3,3,4,4-tetrafluoro-2,2-dihalo - 1 - hydroxycyclobutyl)-substituted amide products of the present invention. More specifically, from formamide and 2,2-dichloro-3,3,4,4-tetrafluorocyclobutanone there will be obtained N-(2,2-dichloro - 3,3,4,4 - tetrafluoro - 1 - hydroxycyclobutyl)-formamide; from pentadecanamide and 2-chloro-2,3,3,4,4-pentafluorocyclobutanone there will be obtained N-(2-chloro - 2,3,3,4,4 - pentafluoro - 1 - hydroxycyclobutyl)-pentadecanamide; from N-tetradecylpentadecanamide and perfluorocyclobutanone there will be obtained N-(2,2,3,3,4,4-hexafluoro - 1 - hydroxycyclobutyl) - N - tetradecylpentadecanamide; from N,N'-dimethyladipamide and 2-bromo-2,3,3,4,4-pentafluorocyclobutanone there will be obtained N,N'-bis(2 - bromo - 2,3,3,4,4 - pentafluoro-1-hydroxycyclobutyl)-N,N'-dimethyladipamide; from thioformamide and 2,2 - dibromo - 3,3,4,4-tetrafluorocyclobutanone there will be obtained N-(2,2-dibromo-3,3,4,4-tetrafluoro - 1 - hydroxycyclobutyl)thioformamide; from anthracenecarboxamide and 2-bromo-2-chloro-3,3,4,4-tetrafluorocyclobutanone there will be obtained N-(2-bromo-2-chloro - 3,3,4,4 - tetrafluoro - 1 - hydroxycyclobutyl)anthraceneamide; from N-phenylthiobenzamide and 2,2-dichloro-3,3,4,4-tetrafluorocyclobutanone there will be obtained N-(2,2-dichloro - 3,3,4,4 - tetrafluoro-1-hydroxycyclobutyl) - N - phenylthiobenzamide; from cyclohexanecarboxamide and 2,2-dibromo-3,3,4,4-tetrafluorocyclobutanone there will be obtained N-(2,2-dibromo-3,3,4,4 - tetrafluoro-1-hydroxycyclobutyl)cyclohexanecarboxamide; from N-cyclohexylcyclohexanethiocarboxamide and 2-bromo - 2 - chloro-3,3,4,4-tetrafluorocyclobutanone there will be obtained N-(2-bromo-2-chloro-3,3,4,4-tetrafluoro - 1 - hydroxycyclobutyl)-N-cyclohexylcyclohexanethiocarboxamide; from C-phenylacetamide and 2-chloro-2,3,3,4,4-pentafluorocyclobutanone there will be obtained N-(2-chloro-2,3,3,4,4-pentafluoro - 1-hydroxycyclobutyl)-C-phenylacetamide; from 1-naphthalenebutyramide and 2-bromo-2,3,3,4,4-pentafluorocyclobutanone there will be obtained N-(2-bromo-2,3,3,4,4-pentafluoro - 1 - hydroxycyclobutyl)-1-naphthalenebutyramide; from cyclohexylacetamide and perfluorocyclobutanone there will be obtained N - (2,2,3,3,4,4-hexafluoro-1-hydroxycyclobutyl)-C-cyclohexylacetamide; from 4-cyclohexylbenzamide and 2,2-dichloro-3,3,4,4-tetrafluorocyclobutanone there will be obtained N-(2,2 - dichloro-3,3,4,4-tetrafluoro-1-hydroxycyclobutyl)-4-cyclohexylbenzamide; from 4-phenylcyclohexanecarboxamide and perfluorocyclobutanone there will be obtained N-(2,2,3,3,4,4-hexafluoro-1-hydroxycyclobutyl)-4-phenylcyclohexanecarboxamide; from benzenesulfonamide and perfluorocyclobutanone there will be obtained N-(2,2,3,3,4,4-hexafluoro-1-hydroxycyclobutyl)benzenesulfonamide; from cyclohexanesulfonamide and perfluorocyclobutanone there will be obtained N-(2,2,3,3,4,4-hexafluoro - 1 - hydroxycyclobutyl)cyclohexanesulfonamide; from propanesulfonamide and perfluorocyclobutanone there will be obtained N-(2,2,3,3,4,4-hexafluoro - 1 - hydroxycyclobutyl)propanesulfonamide; from biuret and 2-bromo-2-chloro-3,3,4,4-tetrafluorocyclobutanone there will obtained N,N'-,N''-tris-(2-bromo-2-chloro3,3,4,4-tetrafluoro - 1 - hydroxycyclobutyl)biuret; from N,N'-ditetradecylurea and perfluorocyclobutanone there will be obtained N,N'-bis(2,2,3,3,4,4-hexafluoro-1-hydroxycyclobutyl) - N,N' - ditetradecylurea; from polyhexamethylenesebacamide and 2,2-dichloro-3,3,4,4-tetrafluorocyclobutanone there will be obtained poly-N-(2,2-dichloro-3,3,4,4-tetrafluoro - 1 - hydroxycyclobutyl)hexamethylenesebacamide; from polydecamethyleneadipamide and 2-bromo - 2,3,3,4,4 - pentafluorocyclobutanone there will be obtained poly-N-(2-bromo-2,3,3,4,4-pentafluoro-1 - hydroxycyclobutyl)decamethyleneadipamide; from polydecamethylenesebacamide and 2 - chloro - 2,3,3,4,4-pentafluorocyclobutanone there will be obtained poly-N-(2-chloro-2,3,3,4,4-pentafluoro - 1 - hydroxycyclobutyl)-decamethylenesebacamide; from polytetramethylenesuberamide and 2,2-dibromo-3,3,4,4-tetrafluorocyclobutanone there will be obtained poly-N-(2,2-dibromo-3,3,4,4-tetrafluoro - 1 - hydroxycyclobutyl)tetramethylenesuberamide.

The N-(3,3,4,4-tetrafluoro-2,2-dihalo-1 - hydroxycyclobutyl)-substituted carboxamides of the present invention are useful both as intermediates and as end products. The tetrafluorodihalohydroxycyclobutyl - N - substituted monomeric amides are formaldehyde reactive and are therefore useful as intermediates in producing amide/formaldehyde resins. More specifically, the N,N'-bis-(hexafluoro-1-hydroxycyclobutyl)urea of Examples VI and VII was dissolved in aqueous 1 N sodium hydroxide solution and treated with formalin equivalent to 0.5 mole/mole of combined hexafluorocyclobutanone in the adduct. After 15 minutes, the reaction mixture was acidified with aqueous 1 N hydrochloric acid solution. A precipitate slowly formed on the walls of the glass reactor. The acidified mixture was let stand overnight, and the solid was removed by filtration, washed, and air-dried. There was thus obtained 22% of theory of the formaldehyde/N,N' - bis(hexafluoro - 1 - hydroxycyclobutyl)urea adduct which was found to contain combined fluorine and, upon heating, turned brown at temperatures above 230° C. but did not melt below 300° C., thereby indicating crosslinked resin formation.

The N - (tetrafluorodihalo-1-hydroxycyclobutyl-substituted)polyamides of the present invention are useful per se as thermosetting resins. More specifically, in contrast to unmodified polyhexamethyleneadipamide, which, as a commercially available molding resin, is known to melt and flow easily at about 250° C., both the alkali-soluble N-(hexafluoro - 1 - hydroxycyclobutyl)substituted polyhexamethyleneadipamides of Examples XI and XII and the unextracted N-(hexafluoro-1-hydroxycyclobutyl)substituted polyhexamethyleneadipamide of Example XII exhibited some softening in the range 150–170° C., but on continued increased heating thereafter stiffened and did not melt below 300° C. In contrast to their behavior before being heated, the heated products were insoluble, thereby establishing the thermosetting properties of the modified polyamides.

Both the monomeric and polymeric N-(tetrafluorodihalo-1-hydroxycyclobutyl)substituted amides of the present invention are useful as modifying agents for preparing improved films from urea/formaldehyde resins. More specifically, n-butyl alcohol solutions of the N-(hexafluoro-1-hydroxycyclobutyl)substituted products of Examples VI and VII and IV and V were mixed with a commercially available 50% solution of butylated urea/formaldehyde resin in n-butyl alcohol in 20/80 proportions based on the total solids. The resulting solutions were then flowed onto sanded black iron panels and baked 30 minutes on a hot plate at 121° C. The properties of the resulting films are summarized in the following table:

| N-(Hexafluoro-1-hydroxycyclobutyl)-substituted Amide | Knife Scratch | Adhesion | Pencil Hardness | Resistance to n-BuOH | Resistance to Acetone |
|---|---|---|---|---|---|
| None—butylated urea/CH₂O control. | fair | fair | <1H | good | good. |
| Urea adduct—Examples VI and VII. | ---do-- | --do-- | 2H | excellent | excellent. |
| Caprolactam adduct—Examples IV and V. | ---do-- | --do-- | 1H | ---do------ | Do. |

Since obvious modifications and equivalents in the invention will be evident to those skilled in the chemical arts, I propose to be bound solely by the appended claims.

The embodiments of the invention in which an exclusive property or privilege is claimed are defined as follows:

1. An amide selected from the group consisting of (1)
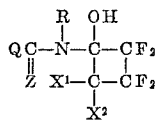

and (2)
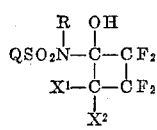

wherein: Q forms with the depicted N and the intermediate C and S a monomeric organic amide radical; X¹ and X² are selected from the group consisting of fluorine, chlorine and bromine; Z is selected from the group consisting of oxygen and sulfur; and R is selected from the group consisting of hydrogen and monovalent hydrocarbon free of aliphatic unsaturation and of no more than 14 carbons and divalent hydrocarbon free of aliphatic unsaturation joined to Q and forming with Q, the depicted N and the intermediate C and S a cyclic structure of 4–13 ring members.

2. A compound of claim 1 wherein X¹ and X² are both fluorine.

3. A compound of claim 1 wherein the amide is a carboxamide.

4. A compound of claim 1 wherein the amide is a thionocarboxamide.

5. A compound of claim 1 wherein the amide is a sulfonamide.

6. N - (2,2,3,3,4,4 - hexafluoro-1-hydroxycyclobutyl) acetamide.

7. N - (2,2,3,3,4,4 - hexafluoro-1-hydroxycyclobutyl) benzamide.

8. N - (2,2,3,3,4,4 - hexafluoro-1-hydroxycyclobutyl) caprolactam.

9. N,N′ - bis(2,2,3,3,4,4 - hexafluoro-1-hydroxycyclobutyl)urea.

10. N - (2,2,3,3,4,4 - hexafluoro-1- hydroxycyclobutyl) thioacetamide.

11. N - (2-chloro - 2,3,3,4,4 - pentafluoro-1-hydroxycyclobutyl)acetanilide.

12. Poly - ε - aminocaproic acid having the 2,2,3,3,4,4-hexafluoro-1-hydroxycyclobutyl radical attached through a carbon-nitrogen bond to about 5–95% of the amide nitrogens.

13. Polyhexamethyleneadipamide having the 2,2,3,3,4,4-hexafluoro-1-hydroxycyclobutyl radical attached through a carbon-nitrogen bond to about 5–95% of the amide nitrogens.

14. The process of preparing a compound of claim 1 which comprises reacting, at a temperature of up to 200° C. and under substantially anhydrous conditions, a monomeric amidohydrogen-containing amide with a 3,3,4,4 - tetrafluoro-2,2-dihalocyclobutanone wherein all halogen is of atomic number 9–35, inclusive.

15. The process of preparing N-(2,2,3,3,4,4-hexafluoro-1-hydroxycyclobutyl) acetamide which comprises reacting, at a temperature of up to 200° C. and under substantially anhydrous conditions, acetamide with perfluorocyclobutanone.

16. The process of preparing N-(2-chloro-2,3,3,4,4-pentafluoro-1-hydroxycyclobutyl)acetanilide which comprises reacting, at a temperature of up to 200° C. and under substantially anhydrous conditions, acetanilide with 2-chloro-2,3,3,4,4-pentafluorocyclobutanone.

17. The process of improving the thermosetting characteristic of an amidohydrogen-containing polyamide which comprises reacting, at a temperature of up to 200° C and under substantially anhydrous conditions, the same with a 3,3,4,4-tetrafluoro-2,2-dihalocyclobutanone, wherein all halogen is of atomic number 9–35, inclusive.

18. The process of improving the thermosetting characteristic of poly-ε-aminocaproic acid which comprises reacting, at a temperature of up to 200° C. and under substantially anhydrous conditions, the same with perfluorocyclobutanone.

19. The process of improving the thermosetting characteristic of polyhexamethyleneadipamide which comprises reacting, at a temperature of up to 200° C. and under substantially anhydrous conditions, the same with perfluorocyclobutanone.

20. A linear polycarboxamide wherein 5–95% of the amide nitrogens carry attached through a carbon-nitrogen bond a radical of the formula

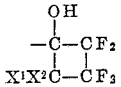

X¹ and X² being selected from the group consisting of fluorine, chlorine and bromine.

21. The process of preparing a compound of claim 20 which comprises reacting, at a temperature of up to 200° C. and under substantially anhydrous conditions, a linear amidohydrogen-containing polycarboxamide with a 3,3,4,4-tetrafluoro-2,2-dihalocyclobutanone wherein all halogen is of atomic number 9–35, inclusive.

No references cited.